(12) United States Patent
Walenta et al.

(10) Patent No.: US 11,358,900 B2
(45) Date of Patent: Jun. 14, 2022

(54) ALUMINOUS CEMENT

(71) Applicant: Calucem GmbH, Mannheim (DE)

(72) Inventors: Günther Walenta, Genas (FR); Ronny Kaden, Edingen-Neckarhausen (DE); Markus Schmid, Nuremberg (DE)

(73) Assignee: Calucem GmbH, Mannheim (DE)

( * ) Notice: Subject to any disclaimer, the term of this patent is extended or adjusted under 35 U.S.C. 154(b) by 61 days.

(21) Appl. No.: 16/956,315

(22) PCT Filed: Dec. 21, 2018

(86) PCT No.: PCT/EP2018/086726
§ 371 (c)(1),
(2) Date: Jun. 19, 2020

(87) PCT Pub. No.: WO2019/129737
PCT Pub. Date: Jul. 4, 2019

(65) Prior Publication Data
US 2020/0317569 A1    Oct. 8, 2020

(30) Foreign Application Priority Data
Dec. 28, 2017 (DE) .................. 10 2017 131 392.3

(51) Int. Cl.
| C04B 14/04 | (2006.01) |
| C04B 14/30 | (2006.01) |
| C04B 7/32 | (2006.01) |
| C04B 28/14 | (2006.01) |
| C04B 103/00 | (2006.01) |
| C04B 28/06 | (2006.01) |
| C04B 111/28 | (2006.01) |

(52) U.S. Cl.
CPC .............. C04B 7/32 (2013.01); C04B 14/04 (2013.01); C04B 14/308 (2013.01); C04B 28/145 (2013.01); *C04B 28/06* (2013.01); *C04B 2103/0042* (2013.01); *C04B 2111/28* (2013.01)

(58) Field of Classification Search
CPC ......... C04B 7/32; C04B 14/04; C04B 14/308; C04B 28/06; C04B 2103/0042; C04B 28/145; C04B 2111/28; C04B 35/66; C04B 41/50; C04B 14/30
See application file for complete search history.

(56) References Cited

U.S. PATENT DOCUMENTS

| 1,913,943 A * | 6/1933 | Morgan ............... C04B 7/32 |
| | | 106/693 |
| 2014/0338569 A1* | 11/2014 | Ostrander ............ C04B 7/32 |
| | | 106/692 |

FOREIGN PATENT DOCUMENTS

| EP | 2803649 B1 | 4/2016 |
| JP | H07232941 A | 9/1995 |
| JP | H1025136 A | 1/1998 |
| JP | 2014224040 A | 12/2014 |
| JP | 2015124119 | 7/2015 |

OTHER PUBLICATIONS

Boris, R., Antonovič, V., Keriené, J. et al. The effect of carbon fiber additive on early hydration of calcium aluminate cement J Therm Anal Calorim 125, 1061-1070 (2016). DOI: 10.1007/s10973-016-5312-2 (Year: 2016).*
International Search Report for PCT/EP2018/086726 dated Mar. 19, 2019 with English Translation.
German Examination Report for: 08010017DE dated Apr. 24, 2018 with English translation.
Written Decision of the International Research Authorities for application No. PCT/EP2018/086726 dated Dec. 6, 2019 with English translation.
Preliminary Report on Patentability PCT/EP2018/086726 dated Dec. 6, 2019 with English translation.
Notice of Reasons for Refusal for Japanese Application No. 2020-536533 dated Mar. 1, 2022 with English Translation.

* cited by examiner

*Primary Examiner* — Kevin E Yoon
*Assistant Examiner* — Marites A Guino-O Uzzle
(74) *Attorney, Agent, or Firm* — Carter, DeLuca & Farrell LLP

(57) ABSTRACT

The present invention relates to an aluminous cement.

13 Claims, No Drawings

ALUMINOUS CEMENT

The present invention relates to an aluminous cement, in particular an aluminous cement produced in a melting process.

Aluminous cements are standardized in EN 14647. Because of their considerably higher aluminate content than Portland cement, they were initially referred to as high alumina cements in the English-speaking world. In Germany, the term aluminous cement was and is still common. The name calcium aluminate cement has become established in the literature, by analogy with Portland cements, which are calcium silicate cements.

Commercially available aluminous cements usually contain 36-82 wt. % aluminum oxide $Al_2O_3$. They can be produced, for example, using a melting or sintering process. The various types of aluminous cement can be divided into the following categories: iron-rich, iron-poor and iron-free.

Typical iron-rich aluminous cements are produced in a melting process, have a gray to black-gray color and can be characterized in their chemical composition as follows:
36-42% $Al_2O_3$, 2-6% $SiO_2$, 14-19% $Fe_2O_3$, 37-40% CaO and less than 1.5% MgO and less than 0.4% $SO_3$.

Low-iron aluminous cements are beige to gray in color and typically contain:
50-55% $Al_2O_3$, 2-6% $SiO_2$, 1-3% $Fe_2O_3$, 37-40% CaO and less than 1.5% MgO and less than 0.4% $SO_3$.

Iron-free aluminous cements are not covered by EN 14647, are white in color and have a correspondingly high degree of brightness, are usually produced in a sintering process, can contain added $Al_2O_3$ and therefore have the following typical compositions:
68-85% $Al_2O_3$, <1% $SiO_2$, <0.5% $Fe_2O_3$, 26-31% CaO.

Depending on the selected ratio of aluminum oxide $Al_2O_3$ to calcium oxide CaO, the following mineral phases form during the production of aluminous cements:

for iron-rich aluminous cement: monocalcium aluminate (CA), brownmillerite ($C_4AF$), belite ($C_2S$), gehlenite ($C_2AS$), mayenite ($C_{12}A_7$) and perovskite (CT)

for low-iron aluminous cement: CA, $C_2AS$, CT, $C_{12}A_7$ and for iron-free aluminous cement: CA, $CA_2$, $C_{12}A_7$, A.

Here, in accordance with the short chemical notation, the notation is as follows:
C: CaO; A: $Al_2O_3$, F: $Fe_2O_3$; H: $H_2O$; $AH_3$: $2Al(OH)_3$, S: $SiO_2$; and T: $TiO_2$.

For the chemical and mineralogical composition of aluminous cements, see, for example, Taylor, "Cement Chemistry," 2nd edition, page 296 and "Lea's Chemistry of Cement and Concrete," 4th edition, 2004, pages 716 et seq.

The hydraulic properties of the aluminous cements, i.e. their very high early strength development in the hour range in comparison with Portland cements, which are more complex to produce, are primarily due to the monocalcium aluminate CA phase. By contrast, the reaction of the $CA_2$ present in higher $Al_2O_3$-containing aluminous cements with water takes place more slowly. The phases CA and, if present, $C_{12}A_7$, are the only phases which react early with water in aluminous cements; see, for example, Taylor, "Cement Chemistry," 2nd edition, page 298 and "Lea's Chemistry of Cement and Concrete," 4th edition, 2004, page 727. The "hydraulic reactivity" of calcium aluminates, i.e. the reactivity thereof with water, increases with an increasing C/A molar ratio, as shown in Table 1 below.

TABLE 1

Relative hydraulic reactivity of calcium aluminates

| Calcium aluminate | C/A molar ratio | Relative reactivity |
|---|---|---|
| $C_3A$ | 3.0 | Very high |
| $C_{12}A_7$ | 1.7 | Very high |
| CA | 1.0 | High |
| $CA_2$ | 0.5 | Very low |
| $CA_6$ | 0.17 | Inert |

Too high a content of $C_{12}A_7$ can result in early setting of the aluminous cement due to its very high hydraulic reactivity.

The strengthening hydration reaction between the CA phase and water basically proceeds in the following manner:
Reaction 1  $CA+10H->CAH_{10}$
Reaction 1.1  $2CA+11H->C_2AH_8+AH_3$
Reaction 1.2  $3CA+12H->C_3AH_6+2AH_3$
Reaction 2  $2CAH_{10}->C_2AH_8+AH_3+9H$
Reaction 3  $3C_2AH_8->2C_3AH_6+AH_3+9H$
Reaction 4  $C_{12}A_7+51H->6C_2AH_8+AH_3$ The material and ambient temperature play a greater role in the hydration of aluminous cements than is the case with Portland cements. The formation of metastable $CAH_{10}$ after reaction 1 preferably takes place at temperatures of <10° C. At higher temperatures between 10° C. and 27° C., after reaction 1.1 metastable $C_2AH_8$ and $AH_3$ are formed in addition to $CAH_{10}$. At higher temperatures, the stable hydrate $C_3AH_6$ also increasingly forms after reaction 1.2. $C_{12}A_7$ hydrates preferably directly after reaction 4 to form $C_2AH_8$ and $AH_3$. Reactions 2 and 3 show that primarily formed $CAH_{10}$ gradually transitions into $C_2AH_8$ and $C_3AH_6$ at temperatures of >10° C., with a significant reduction in volume and the release of aluminum hydroxide and water.

The mineral phases in aluminous cement clinkers are usually predominantly in crystalline form, such that the description of their hydration in accordance with chemical reactions 1 to 4 is possible and useful in the manner shown. As a rule, however, depending on the cooling method used after the sintering or melting process, in addition to the crystalline components, cryptocrystalline and amorphous components may also be present, which can affect the hydraulic reactivity and the general technical properties of the aluminous cement.

However, aluminous cements according to EN 14647 are not so-called quick cements. An important property is that, after being mixed with water, similarly to Portland cements, they initially have a rest phase of one to several hours. According to EN 14647, the start of the setting determined in accordance with EN 196-3 may occur after 90 minutes at the earliest. In this way, standardized aluminous cements can be excellently processed to form mortar and concrete and can also be transported. After setting, however, they then undergo hydration that is incomparably faster than Portland cements, resulting in a high level of compressive strength development within just a few hours.

Commercially available, iron-rich aluminous cements such as those sold under the names Istra 40™ (Calucem), Ciment Fondu® (Kerneos), Electroland™ (Cementos Molins) and Gorkal 40™ (Gorka), low-iron aluminous cements such as Istra 50™ (Calucem), Secar® 51 (Kerneos), Gorkal 50™ (Gorka) and iron-free aluminous cements such as Gorkal 70™ (Gorka), Secar® 71 (Kerneos) and CA14™ (Almatis), tested on standard mortar according to EN 14647, can already exhibit compressive strengths after 6 hours that correspond to those of Portland cements of quality grade CEM I 32.5 or even quality grade 42.5 after 28 days. The main application of aluminous cements is in building chemistry formulations, refractory mortars and concretes from the refractory industry and other special fields of application. Such fields are, for example, the lining of sewage pipes in the presence of acidic or aggressive water, to which Portland cements do not offer sufficient resistance, or the solidification of problematic waste materials and demobilization of pollutants, which hinder or prevent the hardening of Portland cements. However, aluminous cements are also used in sewage treatment, for example for desulfation, through the formation of poorly soluble calcium aluminate sulfate hydrates.

Mixtures of aluminous cements with Portland cements produced in a suitable manner result in binders which, after being mixed with water, have short setting or hardening times. On the basis of this property, aluminous cements, as an accelerating component of a wide variety of chemical formulations for construction, after having been mixed with water, enable the setting and hardening behavior of flowing compounds, pastes, mortars and concretes which can adjusted precisely within a period of a few minutes to a few hours.

To achieve and precisely regulate additional properties, such chemical formulations for construction often contain a large number of other additives, such as setting retarders and/or accelerators, flow agents, "consistency enhancers," fillers, etc., with the aid of which, for example, the setting behavior can be adjusted, the water requirement to achieve a specific consistency can be reduced, water retention can be increased, and the adhesion to certain materials can be improved, as is required for plaster and tile adhesive, for example. It is almost impossible to compile even an approximately complete list of commercially available chemical products for construction. The development and optimization of formulations until they are ready for market is usually very complex and lengthy. The exact compositions are therefore usually industrial secrets.

EP 2 803 649 B1 describes a white, iron-free aluminous cement and its use in refractory mortars and concretes. The aluminous cement has a high content of monocalcium aluminate CA and therefore has a very high hydraulic reactivity (product name: HiPerCem, Calucem GmbH). Owing to the low proportion of binder required in refractory mortars and concretes that are based on this aluminous cement due to their high hydraulic reactivity, their lower refractory properties are compensated or overcompensated in direct comparison with commercially available, special aluminous cements.

The problem addressed by the present invention is to provide an aluminous cement having high hydraulic reactivity that is cost-effective to produce.

This problem is solved by an aluminous cement according to claim 1.

The aluminous cement according to the invention exhibits an unexpectedly high hydraulic reactivity compared with the prior art.

The production of a white, iron-free aluminous cement, as is known from the prior art, is linked to special, pure white raw-material components, a suitable furnace system, special fuels and, in order to avoid iron inputs, also special grinding systems. The aluminous cement according to the invention can be produced in standard furnace systems using conventional, cost-effective fuels. In addition to high-quality raw materials, certain recycling materials, for example from the refractory industry, can be used in part as raw-material components. The clinker can be ground in any suitable grinding system from the prior art, including conventional ball mills. In this way, a versatile, comparatively cost-effective aluminous cement having an exceptionally high hydraulic reactivity and a resulting wide range of uses is provided.

The aluminous cement according to the invention is characterized in that it contains at least 75 wt. % and at most 89 wt. % monocalcium aluminate, CA in crystalline or amorphous form or as a mixture of crystalline and amorphous fractions, wherein it contains at least 53 wt. % aluminum oxide calculated as $Al_2O_3$ and has an A/C value based on wt. % in the range of from 1.45 to 1.85, contains at most 39 wt. % calcium oxide, has a Blaine fineness of from 3500 to 6000 $cm^2/g$, has a slope n in the range of from 0.7 to 1.5, and has a position parameter x' of 8-30 µm in an RRSB particle size grid according to DIN 66145 and its color in the L*a*b* color system is in the range of values: L*<85, preferably <80.

Separately therefrom, an aluminous cement is likewise within the meaning of the present invention, which is characterized in that it contains at least 75 wt. % and at most 89 wt. % monocalcium aluminate, CA in crystalline or amorphous form or as a mixture of crystalline and amorphous fractions, wherein it contains at least 53 wt. % aluminum oxide calculated as $Al_2O_3$ and has an A/C value based on wt. % in the range of from 1.45 to 1.85, contains at most 39 wt. % calcium oxide, has a Blaine fineness of from 3500 to 6000 $cm^2/g$, has a slope n in the range of from 0.7 to 1.5, and has a position parameter x' of 8-30 µm in an RRSB particle size grid according to DIN 66145, and has an iron content calculated as $Fe_2O_3$ of from 0.1 to 10.0 wt. %, and preferably has an $SiO_2$ content of 0.2 to 4 wt. %.

The invention also relates to the use of aluminous cement as a binder component in formulations in the construction chemicals industry, the refractory industry and other fields of application for aluminous cements.

The invention also relates to formulations in the construction chemicals industry and/or the refractory industry which contain the aluminous cement according to the invention as a binder component.

In comparison with known, in particular iron-containing, non-white comparative products, the aluminous cement according to the invention has, inter alia, a significantly higher content of monocalcium aluminate CA of between 75% and 89%, with the simultaneous presence of a ratio of $Al_2O_3/CaO$ in wt. % in the range of from 1.45 to 1.85. In this way, in particular, the aluminous cement according to the invention has an advantageous hydraulic reactivity and early strength development compared with the known comparison products just mentioned, in particular within the first 12 hours after being mixed with water.

The position parameter x' in the RRSB particle size grid according to DIN 66145 denotes the particle size at which the proportion of those particles that are larger than x' (in µ) is 36.8% and the proportion of those particles that are smaller than x' is 63.2%. The slope n of the RRSB line is a measure of the breadth of the distribution. The greater the value of n, the narrower the particle size distribution. The water demand of a cement increases as the Blaine value increases and the position parameter x' of the particle size distribution decreases and also increases with the same position parameter x' as the particle size distribution becomes narrower; see e.g. S. Sprung, K. Kuhlmann, H.-G. Ellerbrock, "Korngrößenverteilung and Eigenschaften von Zement" [Particle size distribution and properties of cement], Part II, ZKG No. 9/1985, page 530 and VDZ Zementtaschenbuch [VDZ Cement Reference Book] 2002, point 5, pages 139 et seq.

The mineral phases mentioned below may typically be present as further mineral phases: $C_{12}A_7$, $C_2AS$, $CA_2$, $C_4AF$, $C_2S$ CT, $C_3FT$, Mg—Fe spinels and pleochroite. The content of these phases may, for example, be present in the proportions mentioned below due to the raw materials and processes used:

$C_{12}A_7$ 0-3 wt. %, $C_2AS$ 1-10 wt. %, $CA_2$ 1-5 wt. %, $C_4AF$ 1-7 wt. %, $C_2S$ 0.5-4 wt. % and pleochroite 0.5-4 wt. %.

It is optional for the aluminous cement to contain 0≤wt. % $C_{12}A_7$≤3, preferably 0.5≤wt. % $C_{12}A_7$≤2.5, and particularly preferably 1≤wt. % $C_{12}A_7$≤2.

It is optional for the aluminous cement to contain 1≤wt. % $C_2AS$≤9, preferably 2≤wt. % $C_2AS$≤8, and particularly preferably 3≤wt. % $C_2AS$≤7.

It is optional for the aluminous cement to contain 1≤wt. % $CA_2$≤5, preferably 1.5≤wt. % $CA_2$≤4.5, and particularly preferably 2≤wt. % $CA_2$≤4.

It is optional for the aluminous cement to contain 1 wt. % $C_4AF$≤7, preferably 2≤wt. % $C_4AF$≤6, and particularly preferably 3≤wt. % $C_4AF$≤5.

It is optional for the aluminous cement to contain 0.5≤wt. % $C_2S$≤3, preferably 1≤wt. % $C_2S$≤2.5, and particularly preferably 1.5≤wt. % $C_2S$≤2.

It is optional for the aluminous cement to contain 0.5≤wt. % pleochroite≤4, preferably 1≤wt. % pleochroite≤3.5, and particularly preferably 1.5≤wt. % pleochroite≤3.

In addition to the crystalline form, the mineral phases mentioned may also be present in the aluminous cement according to the invention in a proportion in cryptocrystalline and amorphous form, or as mixtures of crystalline, cryptocrystalline and/or amorphous forms. When the phase content is stated in wt. %, the amorphous proportions thereof having the same chemical composition are also included.

The aluminous cement according to the invention can optionally be characterized in that it contains at least 0.1 wt. %, preferably at least 0.15 wt. %, preferably at least 0.5 wt. %, preferably at least 1 wt. %, preferably at least 1.5 wt. %, preferably at least 2 wt. %, preferably at least 2.5 wt. %, preferably at least 3 wt. %, preferably at least 3.5 wt. %, preferably at least 4 wt. %, iron calculated as $Fe_2O_3$.

The aluminous cement according to the invention can optionally be characterized in that it contains at most 10 wt. %, preferably at most 9 wt. %, preferably at most 8 wt. %, preferably at most 7.5 wt. %, preferably at most 7 wt. %, preferably at most 6.5 wt. %, preferably at most 6 wt. %, preferably at most 5.5 wt. %, preferably at most 5 wt. %, iron calculated as $Fe_2O_3$.

The aluminous cement according to the invention can optionally be characterized in that it contains at least 0.2 wt. %, preferably at least 0.3 wt. %, preferably at least 0.4 wt. %, preferably at least 1 wt. %, preferably at least 0.5 wt. %, preferably at least 0.6 wt. %, preferably at least 0.7 wt. %, preferably at least 0.8 wt. %, preferably at least 1 wt. %, preferably at least 2 wt. %, silicon dioxide calculated as $SiO_2$.

The aluminous cement according to the invention can optionally be characterized in that it contains at most 4 wt. %, preferably at most 3.8 wt. %, preferably at most 3.6 wt. %, preferably at most 3.4 wt. %, preferably at most 3.2 wt. %, preferably at most 3 wt. %, preferably at most 2.8 wt. %, preferably at most 2.6 wt. %, preferably at most 2.4 wt. %, silicon dioxide calculated as $SiO_2$.

The aluminous cement according to the invention can optionally be characterized in that it contains at least 77 wt. % and at most 87 wt. % CA, preferably at least 79 wt. % and at most 85 wt. % CA, preferably at least 81 wt. % and at most 83 wt. % CA.

The aluminous cement according to the invention can optionally be characterized in that the slope n is in the range of from 0.8 to 1.4, preferably in the range from 0.9 to 1.3, preferably in the range from 1 to 1.2.

The aluminous cement according to the invention can optionally be characterized in that it has a Blaine fineness in the range of from 3700 to 5500 $cm^2/g$, preferably 4000 to 5200 $cm^2/g$, preferably 4200 to 5000 $cm^2/g$, preferably 4400 to 4800 $cm^2/g$.

The aluminous cement according to the invention can optionally be characterized in that the position parameter x' is preferably in the range of from 9 to 28 µm, preferably in the range of from 10 to 26 µm, preferably in the range of from 12 to 24 µm, preferably in the range of from 14 to 22 µm, preferably in the range of from 16 to 20 µm.

The aluminous cement according to the invention can optionally be characterized in that it contains at least 0.1 wt. % carbon, preferably at least 0.5 wt. %, preferably at least 1 wt. %.

The aluminous cement according to the invention can optionally be characterized in that it comprises other elements or oxides in various oxidation states and their related components Si, Mg, Sr, Ba, Ti, Zr, V, P, Cr, Mn, Zn oxides and/or other transition metals.

The aluminous cement according to the invention can be melted or sintered from a corresponding mixture of different aluminum-containing and calcareous feedstocks. Secondary substances of a suitable composition can also be used.

The clinker is ground after cooling. The grinding system, duration and energy input are selected such that the desired particle size distribution and fineness of grinding are obtained. Classification can also be carried out if necessary. The cooled, small-sized aluminous cement clinker is finely ground in suitable grinding installations according to EN 14647, point 5, usually without further additives. Ball mills in which grinding balls of different sizes crush the material to be ground in a rotating, cylindrical mill body by rolling and falling movements are generally suitable. Ball mill systems are usually equipped with mass flow controls and so-called air classifiers, which remove the proportion of cement from the grinding circuit that has reached the target fineness and the desired particle size parameters. However, high-compression roller mills that operate in accordance with the pressure comminution process are also suitable, alone or in combination with ball mill systems and/or vertical roller mills. It is also possible to set the particle size parameters according to the invention by mixing different batches of cement from the same or different mill systems.

The aluminous cement according to the invention is highly suitable for the production of chemical products for construction, such as spackling pastes, plasters, tile adhesives, repair mortars, flowing compounds, floor leveling compounds, sprayed mortars and shotcretes, concretes for pipe linings, but also for solidifying problematic waste materials and demobilizing pollutants, as well as for use in desulfation processes as part of sewage treatment. Existing formulations can be largely retained for this purpose. The aluminous cement according to the invention provides good slump flow in formulations. Liquefiers and plasticizers can be added thereto as part of formulations. Retarders can be added to modify the high hydraulic reactivity.

The invention will be illustrated on the basis of the following examples, but without being restricted to the embodiments that are specifically described. Unless otherwise stated or unless the context clearly indicates otherwise, percentages relate to the total weight of the mixture.

The iron content of the clinker and aluminous cements is given as $Fe_2O_3$.

The color indications are indications of its brightness value in accordance with the L*a*b* color system. The measurements for the basis of the L*a*b* color system of the International Commission on Illumination (CIE) from 1976 known as "CIELab." In this color system, the measured values designate color positions on 3 spatial coordinates. The a* value defines the color position on the a axis with the contrast colors green and red. Negative values represent green, positive values represent red. The b* value defines a color position on the b axis between the contrast colors blue and yellow. Negative values represent blue, positive values represent yellow. The number range for a* and b* is between −100 and +100. The L* value describes the color-independent brightness (luminance) of the material. The L axis is perpendicular to the a and b axes and has the "contrast gray tones" black (L*=0) and white (L*=100).

The requirements for aluminous cements specified in EN 14647 are based on results of cement tests according to EN 196-1 (Determination of strength), 196-2 (Chemical analysis), 196-3 (Determination of setting times and soundness), 196-5 (Pozzolanicity test for pozzolanic cement), 196-6 (determination of fineness) and 196-7 (Methods of taking and preparing samples of cement). Some test results are given below with reference to the relevant part of EN 196.

EXAMPLE 1

Various raw material mixtures were melted in a laboratory furnace to produce the aluminous cement according to the invention. The crucibles filled with the respective raw meals were heated from room temperature at a heating rate of 3 k/min to temperatures of between 1650° C.–1750° C. and left there for 1 hour. The furnace was then switched off and the crucibles with the melt contained therein were slowly cooled. In the specific examples, the cooling process was carried out from an initial temperature of 1700° C. at a cooling rate of 25 K/min. At 1000° C., all the crucibles were removed from the furnace. The crucibles were further cooled to room temperature by the ambient air. The cooled clinker was prepared from the crucibles using a suitable tool and, after a storage period of 24 hours, was ground on a ball mill without the addition of grinding aids.

Natural limestone, calcined white bauxite, red bauxite and fine-particled alumina, $Al_2O_3$(SO 143, DADCO) were used as starting materials. Table 2 shows the starting materials used for the production of the clinker according to the invention and the chemical compositions thereof.

TABLE 2

Chemical composition of the starting materials
(in accordance with EN 14647 196-2)

| Starting materials | Limestone [%] | Bauxite, calc. [%] | Bauxite, red [%] | Alumina [%] |
|---|---|---|---|---|
| G.V. | 43.66 | 0.39 | 13.32 | 3.00 |
| $SiO_2$ | 0.12 | 5.83 | 1.81 | 0.00 |
| $Al_2O_3$ | 0.19 | 87.80 | 56.76 | 96.67 |
| $TiO_2$ | 0.01 | 3.96 | 2.67 | 0.00 |
| MnO | 0.01 | 0.01 | 0.02 | 0.00 |
| $Fe_2O_3$ | 0.06 | 1.32 | 22.53 | 0.01 |
| CaO | 55.69 | 0.00 | 2.53 | 0.00 |
| MgO | 0.32 | 0.24 | 0.10 | 0.00 |

Six clinker samples according to the invention were melted using the raw materials from Table 2. The mineralogical composition of these clinkers KCAC 1-6 can be found in Table 3. These values are compared with sample analyzes of the commercially available Istra 50™, HiPerCem®, Secar® 71 and Gorkal 70™ aluminous cements. The phase content was determined in each case using the Rietveld software HighScore Plus, version 4.6a from PANalytical BV, Almelo, the Netherlands. A Panalytical Cubix X-ray diffractometer with a fast XCelerator detector was used for the analysis.

TABLE 3

Mineralogical composition of the clinker KCAC 1-6 and four commercial aluminous cements

| | KCAC1 [%] | KCAC2 [%] | KCAC3 [%] | KCAC4 [%] | KCAC5 [%] | KCAC6 [%] | Istra 50 ™ [%] | HiPer Cem ® [%] | Secar ® 71 [%] | Gorkal 70 ™ [%] |
|---|---|---|---|---|---|---|---|---|---|---|
| CA | 88.7 | 81.1 | 75.1 | 88.9 | 82.6 | 75.8 | 63.4 | 94.3 | 59.6 | 72.7 |
| $C_4AF$ | 0.2 | 1.1 | 1.3 | 2.1 | 4.9 | 7.8 | 1.3 | — | — | — |
| $C_{12}A_7$ | 1.7 | 1.8 | 1.8 | 1.8 | 2.1 | 2.4 | 2.1 | 0.9 | 0.4 | 0.3 |
| $C_2AS$ | 2.4 | 6.9 | 10.9 | 1.0 | 2.5 | 3.9 | 16.2 | — | — | — |
| Pleochroite | 1.2 | 2.6 | 3.5 | 0.6 | 1.5 | 2.4 | 6.4 | — | — | — |
| $C_2S$ | 1.8 | 2.4 | 3.5 | 1.0 | 1.7 | 2.6 | 5.6 | — | — | — |
| CT, $C_3FT$ | 0.5 | 1.3 | 1.9 | 0.5 | 1.2 | 1.8 | 3.1 | — | — | — |
| Mg (Al, Fe)$_2O_4$ | 0.1 | 0.6 | 0.4 | 0.5 | 0.7 | 1.2 | 1.9 | — | — | — |
| $CA_2$ | 3.4 | 2.2 | 1.6 | 3.6 | 2.8 | 2.1 | — | 4.6 | 39.5 | 26.2 |
| A | — | — | — | — | — | — | — | 0.2 | 0.5 | 0.8 |

Table 4 shows the chemical composition of the six clinker samples KCAC 1-6 in wt. % ignition-loss-free material, as well as the percentage composition of the relevant raw mixture, also in wt. % ignition-loss-free material, using the raw material components. Table 2 compiled. This is compared with the sample analyzes of the commercially available Istra 50™, HiPerCem®, Secar® 71 and Gorkal 70™ aluminous cements.

TABLE 4

Chemical analyses of the KCAC 1-6 clinker, its raw mixtures and four commercially available aluminous cements (ignition-loss-free analysis data)

| Clinker | KCAC 1 [%] | KCAC 2 [%] | KCAC 3 [%] | KCAC 4 [%] | KCAC 5 [%] | KCAC 6 [%] | Istra 50 ™ [%] | HiPer Cem ® [%] | Secar ® 71 [%] | Gorkal 70 ™ [%] |
|---|---|---|---|---|---|---|---|---|---|---|
| $SiO_2$ | 0.70 | 1.57 | 2.43 | 0.24 | 0.48 | 0.71 | 5.34 | 0.24 | 0.27 | 0.28 |
| $Al_2O_3$ | 62.63 | 59.65 | 56.48 | 61.92 | 57.69 | 53.56 | 50.86 | 64.15 | 69.25 | 70.19 |
| $TiO_2$ | 0.43 | 1.02 | 1.60 | 0.26 | 0.60 | 0.94 | 2.32 | 0.00 | 0.00 | 0.00 |
| MnO | 0.01 | 0.01 | 0.01 | 0.01 | 0.01 | 0.01 | 0.02 | 0.01 | 0.02 | 0.01 |
| $Fe_2O_3$ | 0.19 | 0.38 | 0.58 | 2.15 | 5.04 | 7.92 | 2.27 | 0.06 | 0.08 | 0.09 |
| CaO | 35.70 | 36.88 | 38.26 | 35.15 | 35.87 | 36.49 | 38.38 | 34.32 | 29.72 | 28.77 |
| MgO | 0.23 | 0.27 | 0.32 | 0.21 | 0.23 | 0.24 | 0.48 | 0.42 | 0.20 | 0.21 |
| A/C value | 1.75 | 1.62 | 1.48 | 1.76 | 1.61 | 1.47 | 1.33 | 1.87 | 2.33 | 2.44 |

| Raw materials | [%] | [%] | [%] | [%] | [%] | [%] |
|---|---|---|---|---|---|---|
| Limestone | 36.20 | 37.40 | 38.80 | 35.40 | 35.80 | 36.10 |
| Bauxite, calcined | 10.70 | 25.50 | 40.20 | — | — | — |
| Bauxite, red | — | — | — | 8.10 | 19.20 | 30.30 |
| Alumina | 53.10 | 37.10 | 21.00 | 56.50 | 45.00 | 33.60 |

The clinker samples according to the invention were ground to Blaine finenesses of between 3800 and 4400 cm²/g. With an $Fe_2O_3$ content of 0.19 and 0.58%, respectively, KCAC1 and KCAC3 are low-iron versions having the highest content of monocalcium aluminate CA of 88.7% (KCAC1) and the lowest content of 75.1% (KCAC3). With 88.9% and 75.8%, respectively, KCAC4 and KCAC6 have the highest and the lowest content of monocalcium aluminate CA for the more iron-rich version of the aluminous cement according to the invention with an $Fe_2O_3$ content of 2.15% (KCAC4) and 7.92% (KCAC6), respectively.

Table 5 summarizes the results of determining the Blaine fineness, the particle size parameters x' and n in the RRSB particle size grid in accordance with DIN 66145, and the brightness value L, determined in accordance with the L*a*b* system, for these aluminous cements. In addition, the test results for four comparable, commercially available aluminous cements are shown (Istra 50™, HiPerCem®, Secar 71®, Gorkal 70®).

The particle size parameters x and n were determined using a HELOS laser granulometer with RODOS T4.1 from Sympatec GmbH. The brightness values were measured using a Konica Minolta Chroma Meter CR-400, on the surface of compacted, smoothed and crack-free powder preparations as a double determination.

TABLE 5

Blaine values, particle size and color parameters of the CAC 1-6 and four commercially available aluminous cements

| Aluminous cement | Blaine [cm2/g] | x' [μm] | n | Brightness value L [L*a*b* system] |
|---|---|---|---|---|
| CAC 1 | 4320 | 16.1 | 1.03 | 84.3 |
| CAC 2 | 4030 | 19.8 | 0.98 | 81.4 |
| CAC 3 | 3810 | 22.6 | 0.94 | 79.9 |
| CAC 4 | 4360 | 14.9 | 1.02 | 73.2 |
| CAC 5 | 4204 | 17.3 | 0.99 | 65.8 |
| CAC 6 | 4010 | 19.5 | 0.95 | 60.1 |
| Istra 50 ™ | 3370 | 28.2 | 0.87 | 68.0 |
| HiPerCem ® | 4530 | 13.5 | 1.20 | 93.1 |
| Secar ® 71 | 4130 | 26.8 | 0.81 | 92.5 |
| Gorkal 70 ™ | 4470 | 22.6 | 0.95 | 91.6 |

Table 5 shows the Blaine finenesses of the aluminous cements CAC 1 to CAC 6 according to the invention and the corresponding parameters for Istra 50™, Secar® 71, Gorkal 70™ and HiPerCem®. The brightness values, expressed as L* in the CIE L*a*b* system, are below those of the more complexly produced Secar® 71, Gorkal 70™ and HiPerCem® aluminous cements.

For the cements according to the invention and the comparative samples Istra 50™, Secar® 71, Gorkal 70™ and HiPerCem®, the water demand to achieve the standard stiffness, the setting times for paste and mortar, and the compressive strength development on standard mortar in the time range 6 to 24 hours were determined in accordance with EN 14647. In accordance with the provisions of EN 14647, the test procedure from EN 196-3 is used to determine the standard stiffness and the water demand required therefor. The compressive strength is determined in accordance with EN 14647 on a standard mortar that contains a standard sand content of 1350 g, 500 g aluminous cement and 250 g water. The setting times on the mortar were determined analogously to the procedure according to EN 196-3 on this standard mortar. The results of the tests of the water demand and the setting behavior on paste and mortar are shown in Table 6, and the results of the compressive strength tests are shown in Table 7. Tables 6 and 7 also show the test results for the four comparable, commercially available aluminous cements Istra 50™, HiPerCem®, Secar® 71, Gorkal 70™.

TABLE 6

Blaine values, setting on paste and mortar of the cements CAC 1-6 and four commercially available aluminous cements

| | Blain value [cm²/g] | Water demand [%] | Setting on paste [h:min] Start | End | Setting on mortar [h:min] Start | End |
|---|---|---|---|---|---|---|
| CAC 1 | 4320 | 35.6 | 6:08 | 6:23 | 3:40 | 4:10 |
| CAC 2 | 4030 | 31.6 | 4:15 | 4:55 | 3:35 | 4:00 |
| CAC 3 | 3810 | 31.0 | 4:10 | 4:15 | 3:25 | 3:53 |
| CAC 4 | 4360 | 35.2 | 4:40 | 5:20 | 3:35 | 4:00 |
| CAC 5 | 4204 | 32.2 | 4:30 | 5:10 | 3:20 | 3:40 |
| CAC 6 | 4010 | 31.0 | 4:20 | 5:05 | 3:00 | 3:15 |
| Istra 50 ™ | 3370 | 25.3 | 4:10 | 4:25 | 3:10 | 3:40 |
| HiPerCem ® | 4530 | 34.0 | 6:08 | 6:28 | 3:50 | 4:15 |
| Secar ® 71 | 4130 | 27.0 | 5:40 | 6:15 | 3:00 | 3:20 |
| Gorkal 70 ™ | 4470 | 30.0 | 5:10 | 5:20 | 2:40 | 2:50 |

TABLE 7

Blaine values, compressive strengths of up to 24 hours of the cements CAC 1-6 and four commercially available aluminous cements

| Cement | Blaine [cm²/g] | Compressive strength [MPa] | | | | | | |
|---|---|---|---|---|---|---|---|---|
| | | 6 h | 8 h | 10 h | 14 h | 16 h | 18 h | 24 h |
| CAC 1 | 4320 | 30.2 | 48.8 | 54.3 | 55.3 | 56.5 | 58.0 | 66.1 |
| CAC 2 | 4030 | 36.1 | 51.6 | 54.0 | 56.5 | 57.4 | 60.0 | 66.9 |
| CAC 3 | 3810 | 27.6 | 49.4 | 60.5 | 64.3 | 64.5 | 65.1 | 67.3 |
| CAC 4 | 4360 | 26.9 | 49.5 | 52.6 | 53.5 | 54.2 | 57.0 | 68.3 |
| CAC 5 | 4204 | 41.6 | 53.1 | 56.4 | 58.5 | 60.6 | 63.3 | 66.4 |
| CAC 6 | 4010 | 43.5 | 55.5 | 58.8 | 60.5 | 61.0 | 63.5 | 66.5 |
| Istra 50 ™ | 3370 | 20.8 | 50.8 | 60.0 | 71.7 | 72.1 | 72.7 | 74.9 |
| HiPerCem ® | 4530 | 52.4 | 57.4 | 60.7 | 63.5 | 63.6 | 64.2 | 64.4 |
| Secar ® 71 | 4130 | 29.9 | 42.0 | 46.2 | 49.2 | 50.2 | 52.2 | 55.4 |
| Gorkal 70 ™ | 4470 | 38.8 | 43.8 | 47.1 | 48.7 | 49.4 | 51.1 | 50.6 |

It is clear from Table 6 that the cements CAC 1 to CAC 6 according to the invention have the same good processing properties as commercially available aluminous cements.

Table 7 shows that the cements CAC 1 to CAC 6 according to the invention in standard mortar have a significantly higher early strength up to 8 hours after preparation than the comparable high-quality white aluminous cements Secar® 71 and Gorkal 70™. After 24 hours, the strength level of the cements CAC 1 to CAC 6 is significantly higher than that of the commercially available cements Gorkal 70™, Secar® 71 and HiPerCem®.

EXAMPLE 2

In a large-scale industrial test, three clinkers according to the invention and resulting cements were produced. The clinkers were produced in an L-shaped shaft furnace with a suitable refractory lining, as is standard in the aluminous cement industry. The furnace was fired with coal. The melting points were between 1,650° C. and 1,750° C. Limestone, alumina in the form of hydraulic or cement-bound briquettes and red bauxite were used as raw materials in suitable proportions. The chemical composition of the limestone, red bauxite and alumina corresponded to Table 2. A total of 32 tons of clinker were produced and the three clinkers according to the invention were then ground in a ball mill.

Table 8 shows the phase distribution of the three clinkers PKCAC 1, PKCAC 2 and PKCAC 3 according to the invention, which were produced on a large scale. The chemical composition thereof is shown in Table 9.

TABLE 8

Mineralogical composition of the clinkers PKCAC 1-3

| | PKCAC1 | PKCAC2 | PKCAC3 |
|---|---|---|---|
| CA | 88.3 | 87.0 | 86.7 |
| $C_4AF$ | 0.4 | 0.3 | 0.3 |
| $C_{12}A_7$ | 2.3 | 2.8 | 2.8 |
| $C_2AS$ | 1.3 | 2.0 | 2.3 |
| Pleochroite | 3.1 | 3.2 | 3.3 |
| $C_2S$ | 0.5 | 0.0 | 0.7 |
| CT, $C_3FT$ | 1.3 | 1.5 | 1.4 |
| $Mg(Al, Fe)_2O_4$ | 2.3 | 2.7 | 1.9 |
| $CA_2$ | 0.5 | 0.5 | 0.6 |

TABLE 9

Chemical composition of the clinkers PKCAC 1-3

| | PKCAC1 [%] | PKCAC2 [%] | PKCAC3 [%] |
|---|---|---|---|
| SiO2 | 0.78 | 0.64 | 0.66 |
| Al2O3 | 58.59 | 59.63 | 60.20 |
| TiO2 | 0.73 | 0.63 | 0.63 |
| MnO | 0.03 | 0.03 | 0.03 |
| Fe2O3 | 5.83 | 5.16 | 5.14 |
| CaO | 33.05 | 33.21 | 33.12 |
| MgO | 0.69 | 0.68 | 0.69 |
| A/C value | 1.77 | 1.80 | 1.82 |

For the cements PCAC 1, PCAC 2 and PCAC 3 according to the invention ground from the clinkers PKCAC 1, PKCAC 2 and PKCAC 3 and the commercially available comparative cements, the grinding finenesses n are shown in Table 10. Blaine, the particle distribution and the brightness values L* compiled. Table 11 contains the values for the water demand and the setting on paste and mortar determined in accordance with EN 193. Table 12 contains the detailed data for the early strength development in the time range of between 6 and 24 hours. The strength development is reproduced in Table 12.

TABLE 10

Blaine values, particle size distribution and L* values for the PCAC 1-3 and four commercially available cements

| Aluminous cement | Blaine [cm²/g] | x' [µm] | n | Brightness value L [L*a*b* system] |
|---|---|---|---|---|
| PCAC1 | 5900 | 9.4 | 0.78 | 63.1 |
| PCAC2 | 4200 | 21.3 | 0.76 | 64.3 |
| PCAC3 | 3340 | 29.0 | 0.79 | 61.2 |
| Istra 50 ™ | 3370 | 28.2 | 0.87 | 68.0 |
| HiPerCem ® | 4530 | 13.5 | 1.20 | 93.1 |
| Secar ® 71 | 4130 | 26.8 | 0.81 | 92.5 |
| Gorkal 70 ™ | 4470 | 22.6 | 0.95 | 91.6 |

TABLE 11

Blaine values, setting on paste and mortar of the cements PCAC 1-3 and four commercially available aluminous cements

|  | Blaine value [cm²/g] | Water [%] | Setting on paste [h:min] | | Setting on mortar [h:min] | |
| --- | --- | --- | --- | --- | --- | --- |
|  |  |  | Start | End | Start | End |
| PCAC1 | 5900 | 24.0 | 5:30 | 6:30 | 1:40 | 2:08 |
| PCAC2 | 4200 | 23.6 | 5:10 | 5:40 | 1:45 | 2:15 |
| PCAC3 | 3340 | 23.0 | 5:00 | 5:30 | 1:52 | 2:21 |
| Istra 50 ™ | 3370 | 25.3 | 4:10 | 4:25 | 3:10 | 3:40 |
| HiPerCem ® | 4530 | 34.0 | 6:08 | 6:28 | 3:50 | 4:15 |
| Secar ® 71 | 4130 | 27.0 | 5:40 | 6:15 | 3:00 | 3:20 |
| Gorkal 70 ™ | 4470 | 30.0 | 5:10 | 5:20 | 2:40 | 2:50 |

TABLE 12

Blaine values, compressive strengths up to 24 hours of the cements PCAC 1-3 and four commercially available aluminous cements

| Cement | Blaine [cm²/g] | Compressive strength [MPa] | | | | | | |
| --- | --- | --- | --- | --- | --- | --- | --- | --- |
|  |  | 6 h | 8 h | 10 h | 14 h | 16 h | 18 h | 24 h |
| PCAC 1 | 5900 | 23.9 | 65.8 | 68.2 | nd | nd | 82.1 | 86.4 |
| PCAC 2 | 4200 | 18.6 | 52.8 | 72.9 | nd | nd | 80.6 | 84.1 |
| PCAC 3 | 3340 | 19.1 | 64.2 | 73.0 | nd | nd | nd | 82.2 |
| Istra 50 ™ | 3370 | 20.8 | 50.8 | 60.0 | 71.7 | 72.1 | 72.7 | 74.9 |
| HiPerCem ® | 4530 | 52.4 | 57.4 | 60.7 | 63.5 | 63.6 | 64.2 | 64.4 |
| Secar ® 71 | 4130 | 29.9 | 42.0 | 46.2 | 49.2 | 50.2 | 52.2 | 55.4 |
| Gorkal 70 ™ | 4470 | 38.8 | 43.8 | 47.1 | 48.7 | 49.4 | 51.1 | 50.6 | nd: not determined

It can be seen from Table 12 that the aluminous cements PCAC 1, PCAC 2 and PCAC 3 according to the invention can have a 6-hour compressive strength that is comparable to that of commercially available comparative products. However, the aluminous cements according to the invention already achieve significantly higher strength after 8 hours than commercially available aluminous cements. The strength after 24 hours of the aluminous cements PCAC 1, PCAC 2 and PCAC 3 according to the invention is significantly higher than that of the commercially available white aluminous cements, which are more complex to produce (Secar® 71, Gorkal 70™, HiPerCem®), and also higher than that of Istra 50™.

EXAMPLE 3

With the aluminous cement according to the invention, different chemical mixtures for construction were produced in the form of a self-leveling spackling paste, using industry-standard binder components, additives and fillers, as are typical for products in the field of tile adhesives, leveling compounds, spackling pastes and repair mortars. Of the chemical formulations for construction, self-leveling spackling paste is a particularly challenging product. On the one hand, these formulations should have good to very good flow over the processing time of 30 minutes, and on the other hand, they must ensure high early strength and quick accessibility. As a rule, high-quality self-leveling spackling pastes have a high aluminous cement content.

The composition of the various formulations is reproduced in Table 13 in full. The formulation components are divided into "binders," "additives I and II" and "fillers." Each of the basic formulations were produced with three aluminous cements according to the invention: the aluminous cements PCAC1, PCAC2, PCAC3 according to the invention, the commercially available comparative cements Secar® 71 (from Kerneos), Gorkal 70™ (from Gorka) and the comparative cement Istra 50™ (from Calucem).

The seven mixtures were each produced with the same binder content and, over a period of 30 minutes after their preparation, were tested for their consistency by measuring the slump a5, a15 and a30, and were tested for their compressive strength development after 4, 6 and 24 hours on standard prisms 4 cm×4 cm×16 cm. The terms and abbreviations used in Table 13 are explained below.

The term "binder" is understood to mean the following proportions of the formulation: Portland cement (OPC) Dyckerhoff White Speed CEM I 42.5 R, Dyckerhoff, aluminous cement (CAC) and calcium sulfate (HH) Alpha-Hemihydrate Special 40 W, from Casea.

"Additives I" are additives having a primarily retarding and accelerating effect: tartaric acid L (+) p.a. (WS), from HARKE Chemicals GmbH; sodium carbonate wfr. p.a. (NaC), from Neolab, Art. No. 4750; and pure lithium carbonate (LiC), from Merck, Art. No. 5670.

"Additives II" are those additives that primarily influence the consistency of the mixture: hydrated lime (CH), from Otterbein, Art. No. WKH II CL 90; liquefier ViscoCrete-225 P (VF), from SIKA; cellulose ether culminal MHPC-500 PF (CE), from Ashland; and defoamer Agitan P 801 (ES), from Munzing Chemie GmbH, redispersible polymer powder (RPP) ELOTEX FL 2280, from Akzo Nobel Chemicals AG.

Fillers (F) are inert materials that are not involved in the hydraulic reactions. In the examples, quartz sand F34 (F1), from Quarzwerke GmbH, and limestone meal 40GU (F2), from Omya GmbH, were used.

Percentages given in Table 13 relate to the percentage proportion of a component in the total weight of the mixture.

All chemical mixtures for construction were mixed with a constant water/solids value (W/S value) of 0.21.

Apart from the variation of the aluminous cement, no significant change was made within a formulation having a given binder content.

The slump was tested in such a way that, in each case, 2000 g of the dry formulation mixture was weighed exactly and mixed in a mortar mixer according to EN 196 with 420 g demineralized water for 30 seconds at level I and then for 90 seconds at level II. The mixing water was placed in the mixer trough and the dry mixture was then added. The pourable mixture obtained was immediately distributed on 3 flow cones, i.e. annular aluminum vessels having a height of 35 mm and an inner diameter of 68 mm, which were arranged in a centered manner on 3 dry plexiglass slump plates provided with concentric graduations. 5 minutes after the start of mixing, the first cone was raised and the diameter of the mass flowing in a circle was determined as the mean value from two measurements taken perpendicularly to one another using the caliper, as the a5 value. The same procedure was followed after 15 and 30 minutes with the other two cones and the values a15 and a30 were determined.

To determine the compressive strength after 4, 6 and 24 hours, the chemical mixtures for construction were produced in the same way and the pourable materials were poured into prism molds according to EN 196 after the end of mixing without additional compaction measures. The molds were stored in accordance with EN 196 and the prisms were tested according to the standard at the scheduled times.

In Table 13, the aluminous cements PCAC 1, PCAC 2 and PCAC 3 according to the invention are compared with Istra 50™, HiPerCem™, Secar® 71 and Gorkal 70™ in a spackling paste. The formulation was produced with a constant binder content of 29.15%.

TABLE 13

Spackling pastes containing the three aluminous cements PCAC 1-3 according to the invention and the commercially available comparative cements Istra 50, HiPerCem, Secar 71 and Gorkal 70

| Aluminous cement | PCAC1 | PCAC2 | PCAC3 | Istra 50 ™ | HiPer Cem ® | Secar ® 71 | Gorkal 70 ™ |
|---|---|---|---|---|---|---|---|
| Recipe | | | | | | | |
| OPC [%] | 5.93 | 5.93 | 5.93 | 5.93 | 5.93 | 5.93 | 5.93 |
| CAC [%] | 14.48 | 14.48 | 14.48 | 14.48 | 14.48 | 14.48 | 14.48 |
| HH [%] | 8.74 | 8.74 | 8.74 | 8.74 | 8.74 | 8.74 | 8.74 |
| Total binder | 29.15 | 29.15 | 29.15 | 29.15 | 29.15 | 29.15 | 29.15 |
| Additives I | | | | | | | |
| WS [%] | 0.14 | 0.14 | 0.14 | 0.14 | 0.14 | 0.14 | 0.14 |
| NaC [%] | 0.33 | 0.33 | 0.33 | 0.33 | 0.33 | 0.33 | 0.33 |
| LiC [%] | 0.03 | 0.03 | 0.03 | 0.03 | 0.03 | 0.03 | 0.03 |
| Additives II | | | | | | | |
| CH [%] | 0.87 | 0.87 | 0.87 | 0.87 | 0.87 | 0.87 | 0.87 |
| VF [%] | 0.29 | 0.29 | 0.29 | 0.29 | 0.29 | 0.29 | 0.29 |
| CE [%] | 0.07 | 0.07 | 0.07 | 0.07 | 0.07 | 0.07 | 0.07 |
| ES [%] | 0.14 | 0.14 | 0.14 | 0.14 | 0.14 | 0.14 | 0.14 |
| RPP [%] | 0.97 | 0.97 | 0.97 | 0.97 | 0.97 | 0.97 | 0.97 |
| Fillers | | | | | | | |
| F1 [%] | 44.21 | 44.21 | 44.21 | 44.21 | 44.21 | 44.21 | 44.21 |
| F2 [%] | 23.80 | 23.80 | 23.80 | 23.80 | 23.80 | 23.80 | 23.80 |
| W/S value | 0.21 | 0.21 | 0.21 | 0.21 | 0.21 | 0.21 | 0.21 |
| Slump | | | | | | | |
| a5 [mm] | 210 | 220 | 232 | 215 | 221 | 220 | 225 |
| a15 [mm] | 222 | 231 | 220 | 222 | 236 | 232 | 226 |
| a30 [mm] | 220 | 228 | 190 | 235 | 238 | 235 | 143 |
| Compressive strength | | | | | | | |
| 4 h [MPa] | 2 | 6 | 22 | 2 | 28 | 2 | 2 |
| 6 h [MPa] | 19 | 23 | 25 | 2 | 30 | 2 | 3 |
| 24 h [MPa] | 28 | 32 | 33 | 24 | 37 | 27 | 24 |

The slumps identified exhibit the comparatively good flowability and the considerably improved early strength development up to 24 hours when using the aluminous cement according to the invention in comparison with the commercially available comparative cements.

Surprisingly, the aluminous cement according to the invention, in its embodiments, in particular in its low-iron configuration, still exhibits unexpectedly good refractory properties with regard to the cold compressive strength and length change after fire in refractory concrete mixes.

The invention claimed is:

1. An aluminous cement containing at least 75 wt. % and at most 89 wt. % monocalcium aluminate (CA), CA in crystalline or amorphous form or as a mixture of crystalline and amorphous fractions, wherein the aluminous cement contains at least 53 wt. % aluminum oxide calculated as $Al_2O_3$ and has an A/C value, which is a ratio of $Al_2O_3$ (A) and CaO (C), based on wt. % in the range of from 1.45 to 1.85, wherein the aluminous cement contains at most 39 wt. % calcium oxide, wherein the aluminous cement has a Blaine fineness in the range of from 3500 to 6000 $cm^2/g$, wherein the aluminous cement has a slope n in the range of from 0.7 to 1.5, and has a position parameter x' of 8-30 μm in a Rosin-Rammler-Sperling-Bennet (RRSB) particle size grid according to DIN 66145 at the filing date of this application, and a color in the L*a*b* color system in the range of values: L*<85.

2. The aluminous cement according to claim 1, wherein the aluminous cement contains at least 0.1 wt. % iron calculated as $Fe_2O_3$.

3. The aluminous cement according to claim 1, wherein the aluminous cement contains at most 10 wt. % iron calculated as $Fe_2O_3$.

4. The aluminous cement according to claim 1, wherein the aluminous cement contains at least 0.2 wt. % silicon dioxide calculated as $SiO_2$.

5. The aluminous cement according to claim 1, wherein the aluminous cement contains at most 4 wt. % silicon dioxide calculated as $SiO_2$.

6. The aluminous cement according to claim 1, wherein the aluminous cement contains at least 77 wt. % and at most 87 wt. % CA.

7. The aluminous cement according to claim 1, wherein the slope n is in the range of from 0.8 to 1.4.

8. The aluminous cement according to claim 1, wherein the aluminous cement has a Blaine fineness in the range of from 3700 to 5500 $cm^2/g$.

9. The aluminous cement according to claim 1, wherein the position parameter x' is in the range of from 9 to 28 μm.

10. The aluminous cement according to claim 1, wherein the aluminous cement contains at least 0.1 wt. % carbon.

11. The aluminous cement according to claim 1, wherein the aluminous cement comprises other elements or oxides in various oxidation states and their related components Si, Mg, Sr, Ba, Ti, Zr, V, P, Cr, Mn, Zn oxides and/or other transition metals.

12. A binder in a chemical formulation for construction, wherein the binder comprises an aluminous cement according to claim 1.

13. A binder in a refractory formulation, wherein the binder comprises an aluminous cement according to claim 1.

* * * * *